Oct. 29, 1935.   F. G. FOLBERTH ET AL   2,018,843
FLUID PRESSURE CONTROL MECHANISM
Filed July 26, 1932   2 Sheets-Sheet 1

Inventor
FREDERICK G. FOLBERTH
WILLIAM M. FOLBERTH
By Richey & Watts
Attorneys

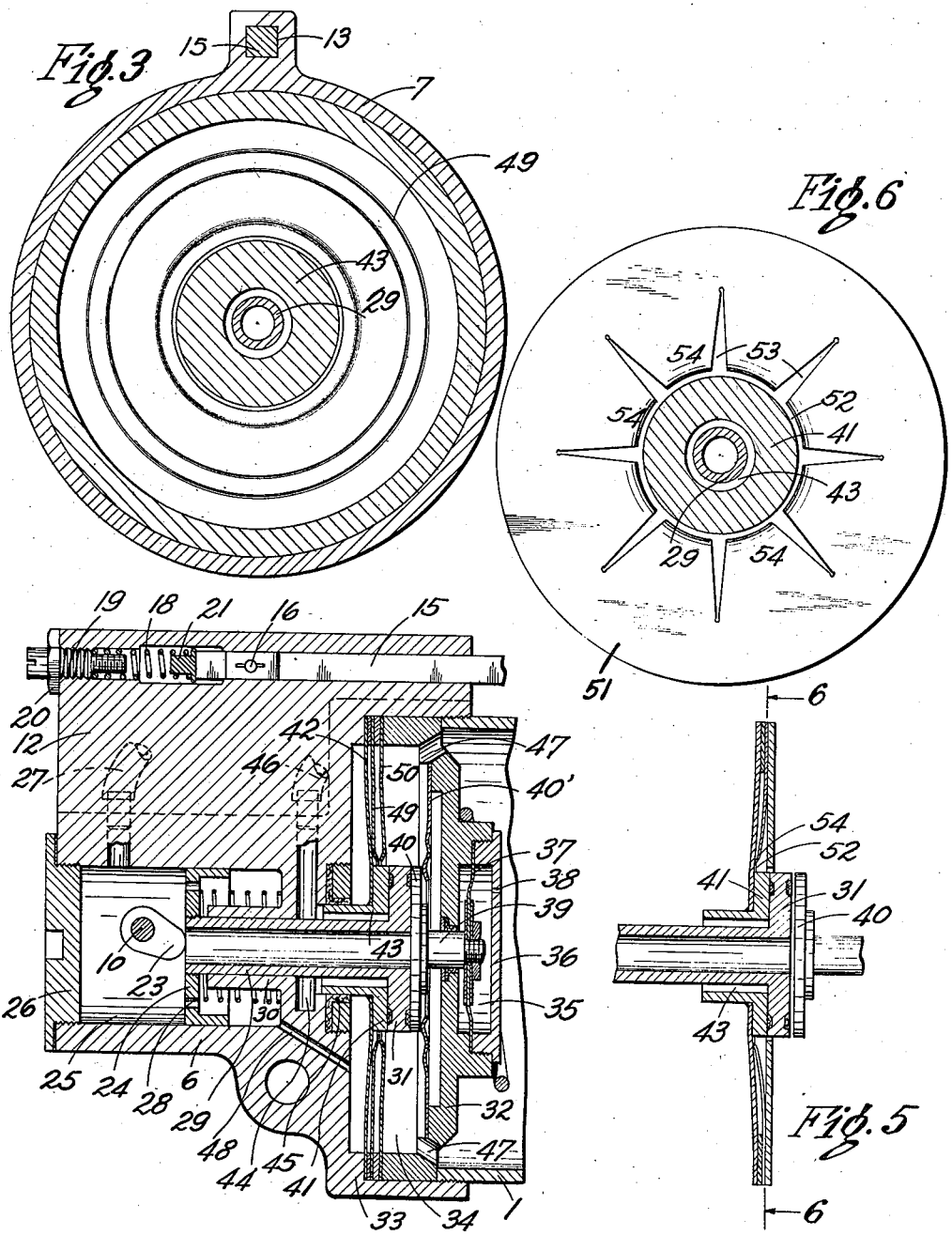

Patented Oct. 29, 1935

2,018,843

UNITED STATES PATENT OFFICE 2,018,843

FLUID PRESSURE CONTROL MECHANISM

Frederick G. Folberth and William M. Folberth, Cleveland, Ohio

Application July 26, 1932, Serial No. 624,774

15 Claims. (Cl. 303—54)

This invention relates to fluid pressure actuated devices and more particularly to control mechanism for controlling the flow of actuating fluid to and from such apparatus.

In our co-pending United States patent application, Serial No. 533,076, filed April 27, 1931, now Patent No. 1,968,484, a division of our application, Serial No. 483,328, filed September 20, 1930, we have described and claimed a control valve arrangement which is particularly adapted for use with fluid pressure actuated brake systems of the vacuum or sub-atmospheric pressure type. The present invention relates to improvements in the general type of valve shown in our above noted co-pending application and contemplates the provision of a valve which will provide a control action particularly suited for vehicle brake operation. The present application is a continuation in part of our above noted co-pending application, Serial No. 533,076 now Patent No. 1,968,484.

A number of valve devices have been proposed for controlling the action of fluid pressure operated brakes. One of the important requirements of such a device is that it be able to control the flow of actuating fluid to and from the operating cylinder in such a way that a smooth and accurately controlled application of the brakes may be obtained together with an instantaneous release of the braking force when desired.

In our co-pending application, Serial No. 561,569, filed September 8, 1931, we have described and claimed a brake actuating mechanism in which means are provided for taking up the lost motion and slack in the brake operating connections and placing the brake shoes substantially in contact with the brake drums upon the preliminary or initial movement of the control mechanism. This mode of operation of fluid pressure actuated brakes possesses certain distinct advantages in that it causes the brake mechanism to be almost instantaneously moved into a position where further movement will cause braking effect and eliminates any lag or slow application of the brakes while permitting an effective control of the actual braking operation. In the usual type of vehicle brakes with which we are familiar, and particularly those used on automobiles, a certain clearance is normally maintained between the brake drums and the brake shoes to prevent drag, and it is among the objects of our invention to provide a control mechanism for fluid pressure actuated brakes in which the slack in the brake connections and the clearance between the brake drums and brake shoes will be rapidly taken up during the initial movement of the control apparatus and the parts maintained in clearance take-up position until it is desired to carry out the actual braking operation.

Other objects of our invention are: the provision of control mechanism for the cylinder of a fluid pressure actuated device which will permit a certain pre-determined operating pressure to be established within the cylinder upon the initial movement of the control mechanism; the provision of control mechanism for fluid pressure actuated devices in which an indication is given to the operator when the apparatus has reached the point where the initial actuating pressure has been established within the cylinder; the provision of a control valve of the type described in our first above noted co-pending United States patent application which incorporates means for automatically retarding the closing of the valve after it has been given an initial operating movement until a pre-determined operating pressure has been established within the cylinder and then quickly closing the valve to maintain this pressure in the cylinder; the provision of an extremely simple and compact control valve construction for fluid pressure actuated devices which is automatic in some of its actions and requires a minimum amount of attention and adjustment.

The above and other objects of our invention will appear from the following description of a preferred and modified form thereof reference being had to the accompanying drawings, in which:—

Figure 3 is a cross sectional view of our valve construction taken on lines 3—3 of Figure 2.

Figure 4 is a fragmentary sectional view similar to Figure 2 but illustrating the valve parts in the positions they assume upon completion of the initial movement thereof, which movement establishes a pre-determined operating pressure within the cylinder.

Figure 5 is a fragmentary sectional view of another form of our improved valve structure showing a modified main diaphragm control disc.

Figure 6 is an end elevation taken on line 6—6 of Figure 5 and illustrating one shape which we have found suitable for the diaphragm control disc illustrated in Figure 5.

Figures 1, 2:
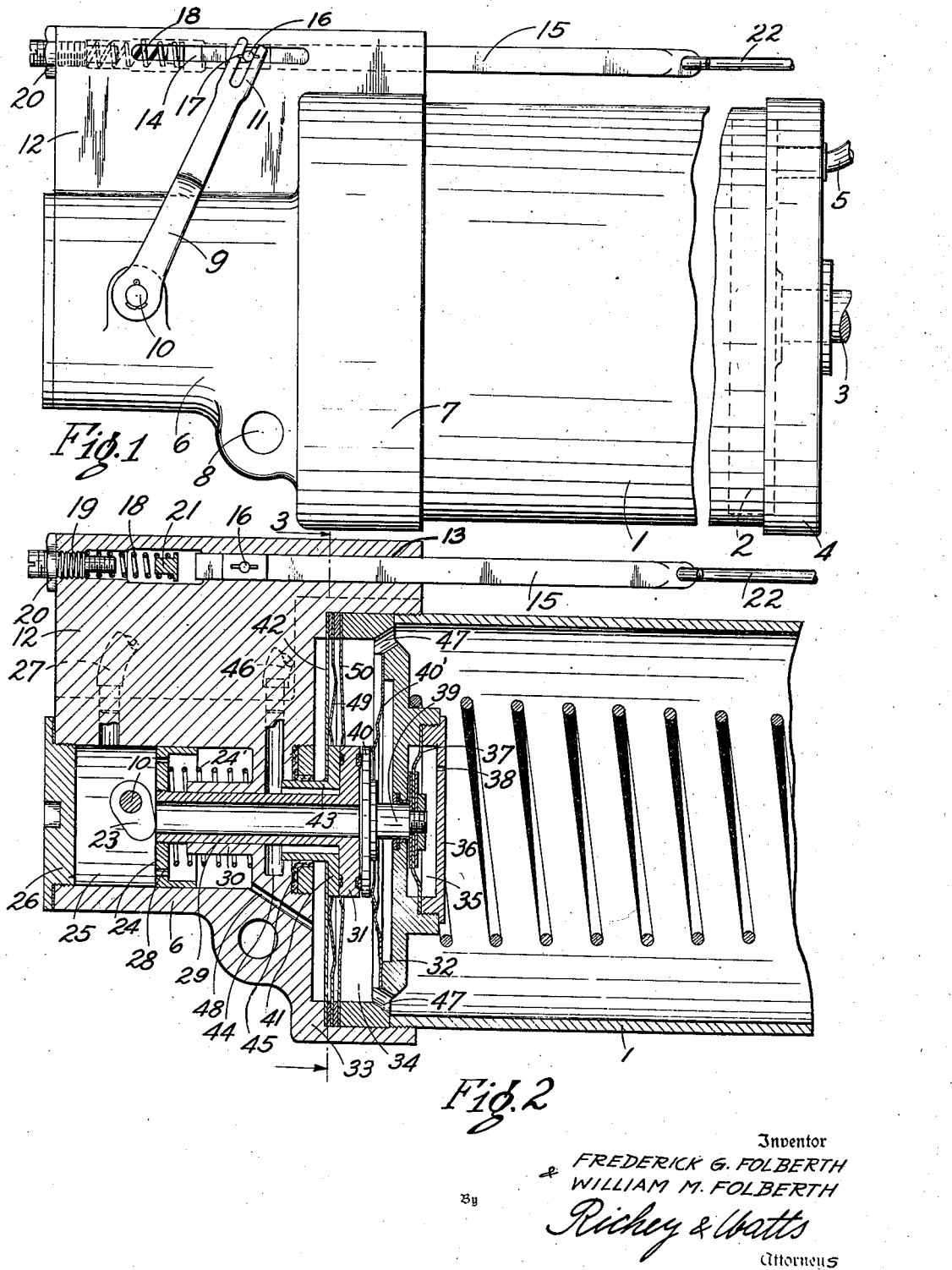
Figure 1 is a side elevation of a fluid pressure actuated device including a cylinder and our improved control valve arrangement.
Figure 2 is a vertical longitudinal section of the apparatus shown in Figure 1, the piston and piston rod end of the cylinder being omitted and the valve parts being shown in their normal or off position.

Referring now to Figures 1 and 2, the cylinder 1, which is adapted to carry the piston 2, is secured to the piston rod 3 which extends out through the end cap 4 of the cylinder. The piston rod 3 may be connected in any suitable manner to operate any desired apparatus, such as the brakes of an automotive vehicle. The end cap 4 is provided with an atmospheric connection conduit 5 which may extend to an air filter (not shown) and serves to maintain a permanent connection between the right hand end of the piston 2 and the atmosphere. The control valve mechanism is preferably enclosed within the housing 6 which may be formed integrally with the end cap 7. The housing 6, in the apparatus illustrated, is provided with a hole 8 through which a bolt or screw may be passed to mount the apparatus in any desired location.

The control valve operating lever 9 is keyed or otherwise secured to the transverse shaft 10 and is provided with a forked upper end 11. A fin or rib 12, preferably formed integrally with the end cap 7 and valve housing 6, extends upwardly and is provided with a longitudinally extending aperture 13. A slot 14 extends through the side of the flange 12 into the aperture 13. An operating bar 15, preferably rectangular in cross section, has a sliding fit within one end of the aperture 13 which is of corresponding rectangular section to the bar 15. At the end of the bar 15 a pin 16 extends outwardly through the slot 14 and passes through the prongs of the forked end 11 of the valve operating lever 9. A transverse pin 17 may be provided in the end of the pin 16 to assist in holding the parts in their proper positions. The left hand end of the aperture 13 forms a housing for the spring 18 the position of which may be adjusted by the screw 19 or by other suitable adjusting means. The adjusting screw 19 has threaded engagement in the flange 12 and may be provided with a lock nut 20 for securing it in the desired position. The flanged head or contact plug 21 is supported in the right hand end of the spring 18 and is adapted to be engaged by the inner end of the rod 15 as will be more fully described later. The outer or right hand end of the rod 15 is adapted to be connected to any desired operating means such as the rod 22. It will be understood that the rod 22 may be replaced by a cable or other connecting means and may extend through suitable connections to an operating point such as the control pedal of an automobile.

The shaft 10 extends transversely of the housing 6 and, as is clearly seen in Figures 2 and 4, carries a cam member 23 which is adapted to engage the face of the guiding piston or plunger 24. The chamber 25 which carries the plunger 24 is closed at its outer end by the end plug 26. However, the chamber is connected to the atmosphere through a suitable conduit 27 which may, if desired, also be connected to an air filter (not shown) to prevent the entry of harmful material to the apparatus. The plunger 24 is provided with holes 28 which permit air to pass freely therethrough and therefore permit the plunger to be freely moved within the chamber 25. A tube 29 is secured to the plunger 24 and is supported by the bearing 30. This tube 29 carries the valve closure member 31 at its inner end.

The end cap 7 is internally threaded at its open end and is screwed into position on the end of the cylinder 1. A cup shaped member 32 is adapted to fit the bore of the end cap 7 and is held in position between the end of the cylinder 1 and the annular shoulder 33 of the cap 7. The member 32, together with the end cap 7, form a main diaphragm chamber 34 and an auxiliary or secondary diaphragm chamber 35 is formed on the cylinder side of the separating wall member 32. The auxiliary chamber 35 is provided with a cap 36 which seats against the auxiliary diaphragm 37 at its outer periphery and holds it in position. Communication between the interior of the cylinder 1 and the diaphragm chamber 35 is established by a relatively small bleeder hole 38. A plunger 39 is secured at one end to the auxiliary diaphragm 37 and extends through the wall 32 into the main diaphragm chamber 34 where it is provided with an enlarged disc seat 40 which is adapted to co-act with the closure member 31.

A second annular seat 41 is adapted to engage the opposite side of the closure member 31 and is secured to and supported by the main diaphragm 42. The seat 41 is provided with a tubular central neck 43 which surrounds the tube 29 and extends into the chamber 44 in the housing 6. Packing 45 may be provided to maintain a fluid tight joint between the tube 43 and the housing 6 through which it passes. The chamber 44 is connected to a source of supply of actuating fluid pressure by a conduit 46. Any desired source of actuating pressure may be utilized, for example, the intake manifold suction of an automotive vehicle.

The main diaphragm chamber, on the right hand side of the diaphragm 42, is connected to the interior of the cylinder 1 by the passages 47 and, on the left hand side of the diaphragm 42, to the atmosphere through the passage 48 which extends into the chamber 25.

The control valve apparatus which has been described up to this point of this specification is substantially the same as to structure and mode of operation as that described and claimed in our above noted co-pending application, Serial No. 533,076, now Patent No. 1,968,484.

In order to secure the desired action of our fluid pressure actuated apparatus in which the initial movement of the operating lever 9 causes a pre-determined pressure to be established within the cylinder 1 we have provided the main diaphragm control disc 49. This disc, which is seen in end elevation in Figure 3, is secured at its outer periphery by the clamping action between the end cap 7 and the member 32 and may be spaced from the main diaphragm 42 by a suitable washer. The control disc 49 in the preferred form of our apparatus, as shown in Figures 2 and 4, is not absolutely flat but is formed with annular grooves, substantially as shown, in order to give the desired snap-over action which will be later explained. A resistance disc 50 is spaced from the control disc 49 by a suitable washer and is held in position by the end cap 7 in the same manner as diaphragm 42 and control disc 49. The control disc 49 and resistance disc 50 are formed with apertures at their centers which are large enough to permit the seat 41 and the closure member 31 to move freely therethrough.

When the bar 15 is moved to the left (Figure 1) the pin 16 causes the control lever 9 to move, turning the shaft 10 and the cam 23. This rotation of the shaft 10 causes the cam 23 to push against the plunger 24 moving it to the right (Figures 2 and 4) against the return spring 24'. This movement of the closure member 31 to the right causes it to engage the disc 40 and close off the atmospheric connection. It will also move the closure member 31 away from the seat 41 and thus communication will be established between the source of reduced actuating pressure and the diaphragm chamber 34 through the tube 43, the chamber 44, and the conduit 46.

As the left hand side of the main diaphragm 42 is connected to the atmosphere, it will be seen that, as soon as the closure member 31 is moved away from the seat 41, and the pressure within the chamber 34 is reduced, the atmospheric pressure on the left hand side of the diaphragm 42 will tend to move this diaphragm together with the seat 41 to the right. If this movement were not opposed it would result in the closing of the vacuum connection as soon as a pressure differential great enough to overcome the resiliency of the diaphragm 42 was built up.

It will be noted that, in Figure 2, the portion of the control disc 49 adjacent its inner edge is in contact with the main diaphragm 42. Thus, when the pressure within the chamber 34 is reduced the control disc 49 tends to prevent movement of the diaphragm 42 to the right and thus maintains open the passage between the closure member 31 and the seat 41. However, when a certain predetermined pressure differential exists between the chamber 34 and atmospheric pressure the atmospheric pressure will exert a force great enough to cause a snap-over action of the disc 49 to take place. When this takes place the parts will assume the position shown in Figure 4 and the seat 41 will again be in contact with the closure member 31 and the source of reduced pressure will be shut off. The snap-over action above referred to is well understood and is similar to that which takes place when a disc of metal which is slightly dished or deformed snaps over from one side of its central plane to the opposite side. The discs 49 and 50 and the diaphragm 42 are preferably made of spring steel and by making them of the proper shape, gauge and temper the apparatus may be arranged so that the snap-over action above described will take place when any predetermined pressure differential has been reached between the diaphragm chamber 34 (and consequently the interior of the cylinder 1) and the atmosphere.

As seen in Figure 4, after the snap-over action has taken place, the closure member is in contact with both of the seats 41 and 40 and the interior of the cylinder is closed off both from the atmosphere and the source of vacuum. Thus, the predetermined vacuum conditions will be maintained within the cylinder until the lever 9 is given further movement to the left causing the closure member 31 to again move toward the right. When this movement takes place the diaphragm chamber 34 and the cylinder 1 will again be connected to the vacuum. The snap-over disc 50 is now in contact on one side with the diaphragm 42 and on its opposite side at its center with the resistance disc 50. Thus, before the seat 41 may be again moved into contact with the closure 31 the pressure differential between the chamber 34 and the atmosphere must be great enough to overcome the inherent resiliency of the diaphragm 42, the disc 49 and the disc 50. When these members are overcome the vacuum connection will be closed and the valve structure as a whole will operate to give the desired smooth variation in the working pressure within the cylinder. The release operation will be substantially the reverse of that above described and the snap-over action of the control disc 49 will assist in the return of the diaphragm 42 and the closure 41 to their normal position.

The auxiliary diaphragm 37 is adapted to retard the movement of the disc seat 40 to the left when the control valve is moved in closing direction. An annularly corrugated disc spring 40' is seated at its outer periphery on the separating wall 32 and at its inner periphery engages the seat 40. This disc is preferably of spring steel or the like and tends to maintain the seat 40 in the position shown in Figure 2.

To understand the operation and function of the auxiliary diaphragm 37 let us assume that the closure member 31 has been moved to the right to establish a relatively high degree of vacuum within the cylinder 1. As the auxiliary diaphragm chamber 35 is connected to the cylinder 1 by the bleeder hole 38 the same low pressure conditions will exist within the chamber 34 as exist within the cylinder. Now if the closure member 31 is moved to the left it will move away from the seat 40 and establish a connection between the chamber 34 and the atmosphere. The air under atmospheric pressure rushes in between the disc 40 and the closure member 31 and very quickly permits the pressure conditions within the cylinder 1 to approach atmospheric pressure. However, the small bleeder hole 38 retards the flow of air into the chamber 35 and thus a certain suction will be exerted against the diaphragm 37 which tends to maintain it in its right hand position against the opposing force of the spring disc 40'. This retarding of the disc 40 by the diaphragm 35 is only momentary as, as soon as the pressure in the cylinder 1 and the auxiliary chamber 35 are equalized, the spring disc 40' will force the seat 40 to the left into contact with the closure member 31. However, this momentary retarding action on the seat 40 is sufficient to permit an almost instantaneous reduction of the effective pressure in the cylinder to a point corresponding to the position of closure member 31.

The snap-over action of the control disc 49 is particularly advantageous as it creates a relatively high resistance to movement of the diaphragm 42 up to the point where the snap-over action has taken place. After the snap-over action has taken place, however, the disc 49 may be relatively freely flexed and does not offer excessive resistance to movement of the diaphragm 42. In fact we have found that it is desirable to employ the resistance disc 50 to add to the resistance of the diaphragm 42 and the snap-over disc 49. This additional resistance increases the sensitivity of the control and reduces the length of travel of the closure member 31 to secure the desired range of pressure control.

In Figures 5 and 6 we have illustrated a modified form of resistance disc which does not include the snap-over feature but which consists of a disc 51 of spring steel or the like which is interposed between the main diaphragm 42 and the resistance disc 50.

The disc 51 is formed with a central aperture 52 (Figure 6) and radially extending slots 53. These slots form inwardly projecting tongues 54 which are bent out of the main plane of the disc as seen in Figure 5. The disc 51 is preferably made of relatively light material. The action of our apparatus when equipped with a control device of this type is substantially the same as that above described in reference to Figures 2 and 4. However, the snap-over action does not take place, but, as the resistance disc 50 is made relatively heavy the initial movement of the closure member will cause it to move away from the seat 41, which seat 41 will be again moved into contact with the closure member by atmospheric pressure as soon as the pressure differential on the opposite sides of the diaphragm 42 becomes great enough to flatten out the tongues 54 of the resistance disc 51. After this has taken place further movement of the diaphragm 42 will be against the relatively great resistance of the control disc 51 plus that of the resistance disc 50.

In adapting our control mechanism to fluid pressure operated brakes or the like we prefer to adjust the position of the spring 18 so that the left hand end of the bar 15 will contact with the head 21 when the closure member 31 has been moved into the position shown in Figure 4. The effect of this adjustment is that, when the operator moves the bar 15, its initial movement will be against very little resistance. This initial movement will open the suction connection and permit the pressure within the cylinder to be reduced to a point when the snap-over action of the diaphragm takes place. If, for example, the piston rod 3 be connected to a brake system the degree of vacuum preliminarily established in the cylinder by this action will preferably be just enough to exert sufficient force to maintain the brakes in clearance take-up position as above described. The operator can feel when he reaches this point in the movement of the bar 15 as further movement of the bar 15 will be against the resistance of the spring 18. The operator, therefore, during the first relatively short movement of the operating lever places the brakes in position for immediate application. This action takes place very quickly and we have found it to be of distinct advantage in fluid pressure operated devices, particularly those which are used for applying the brakes of an automotive vehicle.

Although we have described in considerable detail the forms of our invention illustrated in the attached drawings it will be understood that modifications and variations thereof may be made without departing from the spirit of our invention. We do not, therefore, limit ourselves to the specific details shown and described, but claim as our invention all embodiments thereof coming within the scope of the appended claims.

We claim:

1. In a control valve mechanism of the type described, a movable closure member, a movable seat adapted to be moved by fluid pressure to engage said closure member, means for separating said seat and closure member and means, including a snap-over disc, for retarding initial movement of said seat toward said closure member.

2. A valve for controlling the flow of actuating fluid to and from a cylinder including a housing having a diaphragm chamber, a diaphragm in said chamber, a closure member adapted when in one position to connect the cylinder to a source of sub-atmospheric fluid pressure and when in another position to connect the cylinder to the atmosphere, and means, including a snap-over disc, for retarding the closing of the sub-atmospheric connection during the initial opening movement of the closure member.

3. In a valve for controlling the flow of actuating fluid to a cylinder, a closure member, a seat for said closure member, means for moving said closure member away from said seat, diaphragm means for seating said closure member and seat upon the establishment of a pressure differential between the opposite sides of said diaphragm, and means, effective upon the initial opening of the valve and independent of said diaphragm for imposing a relatively great resistance to movement of said diaphragm until a predetermined operating pressure is reached in said cylinder and then to offer a relatively small resistance to further movement of said diaphragm.

4. In a valve for controlling the flow of actuating fluid to a cylinder, a movable closure member, a movable seat therefor, means for moving said closure member away from said seat, means, including a fluid pressure actuated diaphragm, for moving said seat toward said closure member, and a snap-over disc adapted to retard movement of said diaphragm until a predetermined pressure differential is established between the opposite sides of said diaphragm.

5. In a valve for controlling the flow of actuating fluid to a cylinder, a movable closure member, a movable seat therefor, means for moving said closure member away from said seat, means, including a diaphragm, for moving said seat toward said closure member and means for imposing an added resistance to the initial movement of said diaphragm and seat towards said closure member until a predetermined pressure differential is established between the opposite sides of said diaphragm and then releasing said additional resistance.

6. In a valve of the type described, a diaphragm, a seat member carried by and movable with said diaphragm, and means for retarding movement of said diaphragm and seat member in one direction until a predetermined pressure differential is established between the opposite sides of said diaphragm and then permitting relatively free movement of said diaphragm.

7. In a valve of the type described, a diaphragm, a seat member carried by and movable with said diaphragm and a snap-over disc adapted to engage said diaphragm and retard movement thereof until a predetermined pressure differential is established between the opposite sides of said diaphragm.

8. In a valve for controlling the flow of actuating fluid to and from a cylinder, a housing adapted to form a diaphragm chamber, a diaphragm in said chamber, said diaphragm having a seat portion, a closure member adapted normally to seat on said diaphragm seat portion, means for moving said closure member away from said diaphragm seat portion, and a snap-over member adapted to resist movement of said diaphragm after said closure member is initially moved away therefrom until a predetermined fluid pressure differential is built up between the opposite sides of said diaphragm.

9. A valve of the class described adapted to maintain a definite operating pressure in a cylinder for each position of the valve including, a movable seat, means, including a resilient diaphragm, responsive to the operating pressure in the cylinder, for positioning said seat, and means for retarding the initial movement of said seat until a predetermined operating pressure is established in the cylinder and then permitting relatively free movement of said diaphragm.

10. A valve of the class described adapted to maintain a definite operating pressure in a cylinder for each position of the valve including, a movable seat, means, responsive to the operating pressure in the cylinder, for positioning said seat, and a snap-over member adapted to impose a relatively great resistance to movement of said seat in closing direction until predetermined pressure conditions are established within the cylinder and then to snap over and offer a relatively slight resistance to further movement of said seat in closing direction.

11. A valve of the class described adapted to maintain a definite operating pressure in a cylinder for each position of the valve including, a movable seat, means, responsive to the operating pressure in the cylinder, for positioning said seat, a snap-over member adapted to impose a relatively great resistance to movement of said seat in closing direction until predetermined pressure conditions are established within the cylinder and then to snap over and offer a relatively slight resistance to further movement of said seat in closing direction and means, effective after said snap over action has taken place, for offering additional resistance to movement of said seat.

12. In apparatus of the class described, a cylinder and a valve for controlling the flow of actuating fluid to the cylinder, said valve including a closure member having oppositely disposed seating surfaces, movable seats adapted to engage the seating surfaces of said closure member, means for moving one seating surface of said closure member out of seating engagement with one of said seats while maintaining the other seating surface in engagement with the other of said seats, means for preventing movement of said first mentioned seat toward said closure member until a predetermined pressure is established within said cylinder and means for retarding movement of said second named seat when said closure member is moved in the opposite direction whereby the closure member will be unseated from said second seat.

13. In a valve for controlling the flow of actuating fluid to a cylinder, a closure member having oppositely disposed seating surfaces, movable seats adapted to engage the seating surfaces of said closure member, means for moving one seating surface of said closure member out of seating engagement with one of said seats while maintaining the other seating surface in engagement with the other of said seats, snap-over means for preventing movement of said first mentioned seat until a predetermined pressure is established within said cylinder and means for retarding movement of said second named seat when said closure member is moved in the opposite direction whereby the closure member will be unseated from said second seat.

14. In a valve of the type described, a closure member, a diaphragm, a movable seat supported on and movable with said diaphragm, and a snap-over member adapted to engage said diaphragm and to resist movement thereof toward said closure member.

15. In a control valve for fluid pressure actuated apparatus, a closure member, a movable seat and means, including a snap-over disc, for offering relatively great resistance to movement of said seat upon the initial movement of said closure member away from said seat and adapted to snap over and offer relatively slight resistance to movement of said seat upon establishment of predetermined fluid pressure conditions within the fluid pressure actuated apparatus.

FREDERICK G. FOLBERTH.
WILLIAM M. FOLBERTH.